Nov. 24, 1959 R. C. ZEIDLER ET AL 2,914,158
CLUTCH DEVICES
Filed Sept. 10, 1956 2 Sheets-Sheet 2
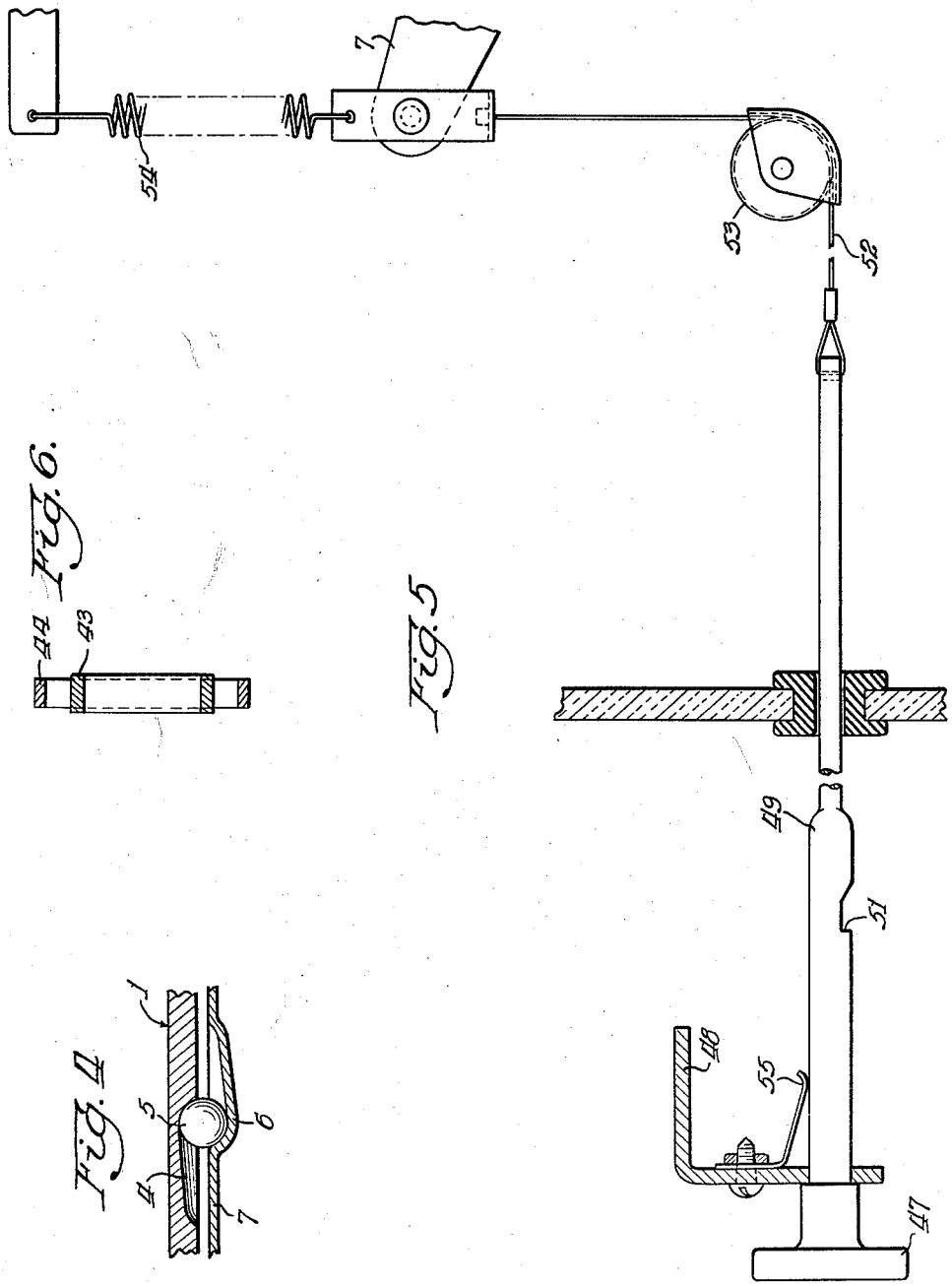
Inventors:
Reinhold C. Zeidler
and William A. Barnes
By: Donald W. Banner
Atty United States Patent Office 2,914,158
Patented Nov. 24, 1959

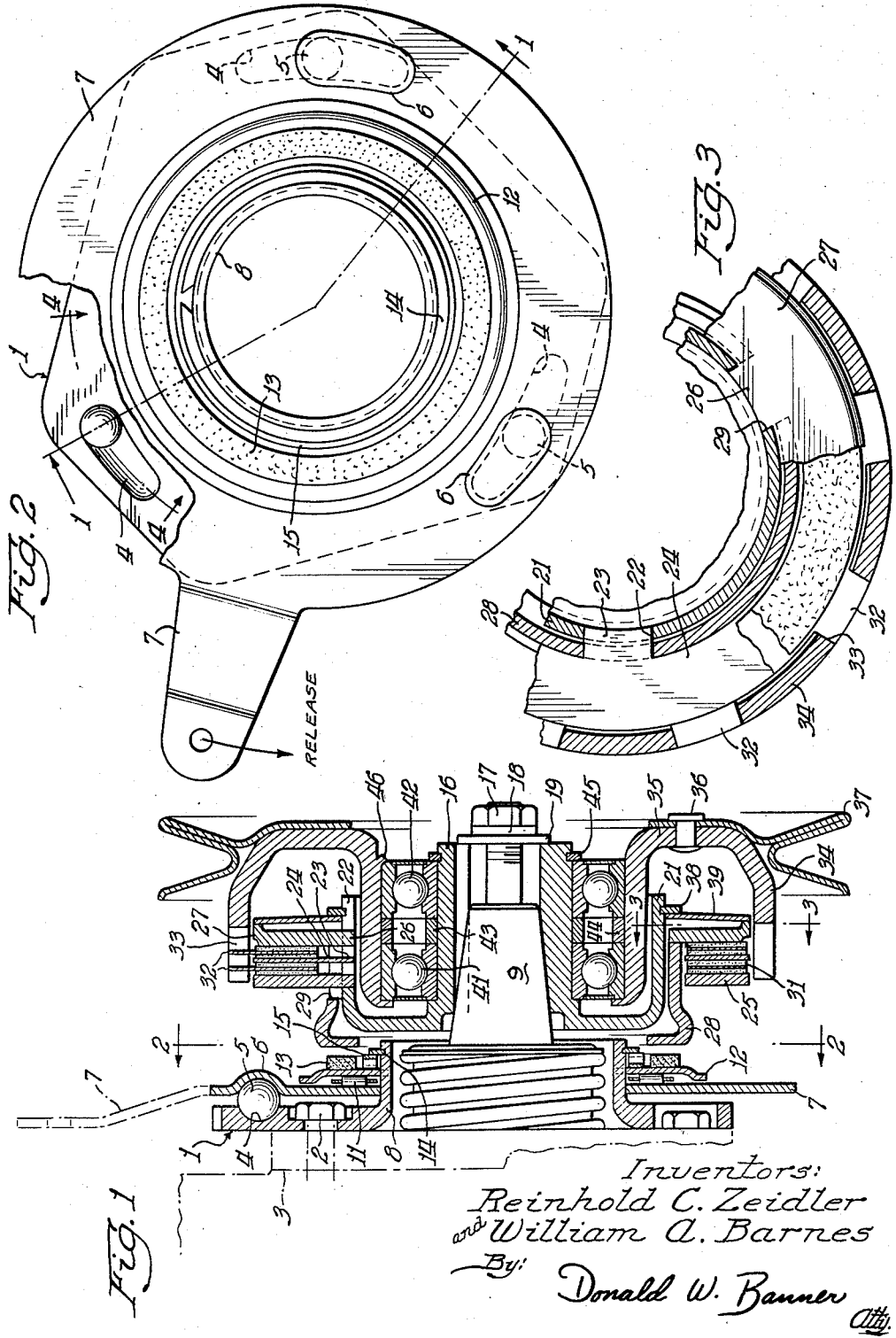

2,914,158

CLUTCH DEVICES

Reinhold C. Zeidler and William A. Barnes, Detroit, Mich., assignors to Borg-Warner Corporation, a corporation of Illinois Application September 10, 1956, Serial No. 608,782

1 Claim. (Cl. 192—89)

This invention relates to clutch devices, and more particularly to clutch devices particularly adapted for effecting a driving connection from a suitable source of power to a vehicle air conditioning compressor or other accessory.

In clutches designed for driving a vehicle accessory, particularly for driving devices such as air conditioners in passenger automobiles, it is essential that the clutch be small in size and low in cost, and yet be completely reliable requiring a minimum of upkeep and inherently possessing long life.

It is, therefore, one object of the present invention to provide such a clutch device.

Another object of the present invention is the provision of a clutch in accordance with the preceding object having a non-metallic thrust bearing normally spaced from the clutch releasing member but engageable therewith to effect its axial movement, the release member normally rotating with the driven members of the clutch and ceasing its rotation upon engagement and axial movement with the non-metallic release bearing.

Another object of the present invention is the provision of a device in accordance with the preceding objects in which a manually operable member is provided which is rotatable to effect axial movement of a cam plate, such axial movement being effected by virtue of a ball-cam slot means, and consequent axial movement of the non-metallic release bearing.

Another object of the present invention is the provision of a device in accordance with the preceding objects in which the device is provided with a pair of preloaded, single row ball bearings maintained in their preloaded condition by a staking operation.

Other objects and features of the invention will be readily apparent to those skilled in the art from the specification and appended drawings illustrating certain preferred embodiments in which:

Figure 1 is a sectional view along the plane of line 1—1 of Figure 2;

Figure 2 is a sectional view along the plane of line 2—2 of Figure 1;

Figure 3 is an enlarged sectional view along the plane of line 3—3 of Figure 1 with part of the structure broken away to facilitate the showing;

Figure 4 is a sectional view along the plane of line 4—4 of Figure 2;

Figure 5 is a diagrammatical representation of an operating system for the device illustrated in Figure 1;

Figure 6 is a cross sectional view of the spacers 43 and 44 similar to the view of Figure 1 but dimensionally exaggerated to emphasize the greater axial extent of spacer 43, as compared to that of spacer 44.

Referring to a preferred form of the present invention as illustrated in Figure 1, there is disclosed therein a mounting plate 1 fixedly mounted as by means of bolts 2 to a fixed member, such as the housing 3 of a compressor for an air conditioner in an automotive vehicle. The plate 1 is provided with three, symmetrically spaced cam slots 4 in each of which is disposed a ball 5. In engagement with each of the balls 5 is a cam portion 6 of an operating lever 7 having a central, circular aperture therein adapted to be mounted rotatably upon a forwardly extending portion 8 of the mounting plate 1, the portion 8 being cylindrical and defining an opening through which the driving shaft 9 of the compressor extends. Disposed in engagement with the front face of the operating lever 7 is a thrust bearing 11, which comprises a plurality of needle bearings disposed in annular array about the portion 8. In engagement with the forwardly facing portion of the thrust bearing 11 is a plate 12 which is keyed to the portion 8 of the mounting plate 1 for axial movement thereon, but prevented from rotative movement relative thereto. Fixedly mounted to the front face of the plate 12 by suitable means, such as cement, is an annular carbon graphite thrust bearing 13. The forwardmost part of the portion 8 of the mounting plate 1 is provided with a snap ring 14, and disposed between this snap ring and the plate 12 is a resilient waved spring washer 15 which operates to bias operating lever 7, thrust bearing 11 and plate 12 rearwardly and thereby prevents rattling as well as maintains these parts in their operative relationship with each other.

Upon the forward end of the shaft 9 is a hub 16. The hub 16 is prevented from axial movement with respect to the hub 9 by means of a cap screw 17, lock washer 18 and a plain washer 19, the cap screw 17 threadably engaging a suitable aperture in the front end of the compressor shaft 9. The hub 16 is prevented from rotating relative to the hub 9 by means of a Woodruff key, not shown. The innermost portion of the hub 16 is generally annular in configuration, the hub 16 being further provided with a generally annular outer flange 21 in which are formed a plurality of circumferentially spaced slots 22 symmetrically disposed therein. Each of the slots 22 receives closely a tang 23 extending inwardly from a driven clutch plate 24; it should be understood that one or more driven plates 24 may be provided. In addition, each of the slots 22 receives a tang extending inwardly from a generally annular back plate 25 disposed at the innermost portion of each of the slots 22; each of the slots 22 also receives closely an inwardly extending tang 26 of a generally annular pressure plate 27. The device is further provided with a generally cup-shaped release collar 28 having a plurality of spaced, symmetrically disposed slots 29 therein, which register with the previously described slots 22, and which also closely receive the inwardly extending tangs 23 from the driven clutch plate 24 and the back plate 25. The pressure plate 27 is disposed in engagement with the most forward portion of the release collar 28 whereby axial movement of collar 28 will effect axial movement of pressure plate 27, in a manner to be subsequently described.

Interleaved with the driven plate 24, the back plate 25 and the pressure plate 27, in the manner illustrated in Figure 1, are a plurality of drive plates 31 carrying suitable friction facings, the plates 31 being generally annular in configuration, and being provided with a plurality of symmetrically spaced tangs 32 which project outwardly therefrom. These tangs 32 are closely received, respectively, in a plurality of axially extending slots 33 formed in a generally annular flange 34 of a generally annular pulley support 35. Fixedly mounted to the front face of the support 35 by suitable means, such as welding and/or rivets 36, is a pulley 37 adapted to be rotatably driven by an engine driven belt (not shown). As illustrated in Figure 1, the forward portion of flange 21 of hub 16 is provided with a snap ring 38; disposed between the snap ring and the forwardly facing lip formed on the radially outer portion of the pressure plate 27 is a Belleville washer 39. It will be seen that the washer 39 biases the pressure plate 27 rearwardly to effect engagement of the driving clutch plates 31 with the driven clutch plate 24 in the normal condition of the device illustrated in Figure 1.

Disposed between the innermost portion of hub 16 and the innermost portion of the pulley support 35 are a pair of single row ball bearings 41 and 42. As illustrated in Figure 1, bearing 41 is maintained in its innermost position by a radially inner extending lip formed integral on the pulley support 35. Between the bearings 41 and 42 are a pair of inner and outer spacers 43 and 44 respectively; these spacers are annular and the inner spacer 43 is preferably approximately 0.010 inch wider, that is, in axial extent, than the outer annular spacer 44. The inner race of the ball bearing 42 is held in position by a snap ring 45 disposed in a suitable slot in hub 16, while the outer race of the ball bearing 42 is held in position by a plurality of circumferentially spaced stakes 46 formed by a staking operation performed upon the pulley support member 35. By making the inner spacer 43 wider than the outer spacer 44, and by making the outer races of the ball bearings 41 and 42 a press-fit and locking them in place by the staking operation, the bearings are substantially preloaded so that little or no looseness exists. This provides more stability for carrying heavy off-center loads, and has a further advantage in that it resists a brinelling or fretting action between the balls and the races caused by vibration. In addition, this provides a substantial reduction in size over structures employing a single double roll bearing.

In Figure 5 there are shown means for effecting manual operation of the operating lever 7. These means comprise a manually operable button 47 slidably extending through a suitable aperture in the instrument panel 48 of the vehicle in which the device of the present invention is disposed. The button 47 is attached to a rod 49 having a latching portion 51 therein, the rod 49 extending through the fire wall of the vehicle and being attached at its innermost end to a light cable 52. The cable 52 passes over a pulley 53 and is connected by suitable means to the operating lever 7. A spring 54, operatively connected to a fixed portion of the vehicle and to the operating lever 7, normally maintains the lever 7 in a position to, for example, maintain the clutch in driving relation. When the button 47 is pulled outwardly, the latching portion 51 of the rod 49 is disposed in engagement with the sides of the aperture in the instrument panel 48 and held in that position by a finger spring 55, also mounted to the instrument panel, to maintain the clutch in its "released" position until the button 47 is again manually operated.

Turning again to a consideration of Figure 1, in the position of the parts illustrated in the Belleville washer 39 biases the pressure plate 27 rearwardly to the end that the driving clutch plates 31 are in tight engagement with the driven clutch plate 24. As a result, when the belt drives the pulley 37 rotation of pulley support 35 occurs. Driving plates 31—having tangs 32 closely received in openings 33 in the pulley support 35—are thereby driven. The frictional engagement of plates 31 with plate 24 causes these also to be driven. In view of the fact that plate 24 has tangs closely received in slots 22 formed in hub 16, the hub and compressor shaft 9 will be rotated. The tangs in plate 24 also effect rotation of release collar 28. The rotation of these parts will continue as long as the belt continues to drive the pulley 37 and the carbon graphite thrust bearing 13 remains in its illustrated condition, spaced rearwardly from the release collar 28. When it is desired to prevent rotation of the compressor shaft 9, the operating lever 7 is rotated in the direction illustrated by the arrow in Figure 2. When this occurs, the balls 5, disposed within the cam slots 4 and the cam portions 6, will be loaded to force axially forward movement of the operating lever member 7. This forward motion is transmitted through the thrust bearing 11 to the plate 12 upon which the carbon graphite release bearing 13 is mounted. As rotation of the operating lever 7 continues, it will be progressively moved axially forwardly until the release bearing 13 engages the release collar 28; subsequent forward movement of the bearing 13 effects axially forward movement of the release collar 28 which, by virtue of the engagement of the forward portion thereof with pressure plate 27, will force the pressure plate 27 axially forwardly against the bias of the Belleville washer 39 to effect a release of the driving relationship between the clutch plates 31 and the clutch plate 24. Despite continued rotation of the pulley 37 and the pulley support 35, the hub 16, driven plate 24, release collar 28 and compressor shaft 9 will no longer be driven and therefore will stop. It should be noted, therefore, particularly, that extremely little sliding friction between bearing 13 and release collar 28 occurs during this operation inasmuch as the release collar 28 when moved forwardly by the bearing 13 interrupts the driving connection to the clutch and stops rotation. As a result, the release bearing employed may be a simple and inexpensive carbon graphite material such as illustrated at 13. Similarly, in the engagement of the clutch, effected by rotation of the operating lever member 7 in the direction opposite to the arrow in Figure 2, the parts are returned to the position illustrated in Figures 1 through 4 and there is only instantaneous sliding friction between the bearing 13 and release collar 28 at the instant that the clutch becomes engaged by virtue of the rearward movement of the pressure plate 27 under the bias of the Belleville washer 39 as the forward bias applied to release collar 28 is removed when the bearing 13 moves rearwardly. The balls 5 are unloaded—as shown in Figure 1—to permit the rearward movement of the operating lever member 7, and the plate 12 also moves rearwardly by virtue of the bias of the spring washer 15. It should be particularly noted once again that in this engaged condition of the clutch there is no friction whatsoever between the bearing 13 and the release collar 28 and these members are substantially spaced from each other so that no wear between these parts occurs.

It should be noted, therefore, that the present invention provides a compact and simple disconnect clutch device permitting the use of a simple, inexpensive carbon graphite ring where otherwise a ball bearing would be required. In addition, the device has a long operating life due to its simplicity and the fact that the member engaged by the graphite ring stops rotating almost as soon as it is engaged by the graphite ring whereby frictional wear is substantially nonexistent; also the preloaded bearings employed prevent fretting action between the balls and races and provide greater capacity for off-center loads. Also the present device is capable of hydraulic, electrical or other control with a minimum of adaptation.

While a certain preferred embodiment of the invention has been specifically disclosed, it is understood that the invention is not limited thereto, as many variations will be readily apparent to those skilled in the art and the invention is to be given its broadest possible interpretation with the terms of the following claim:

We claim:

In a clutch device, generally annular driving means having a first pair of axially extending and radially spaced flanges, generally annular driven means having a second pair of axially extending and radially spaced flanges disposed in telescoped relation with said first pair of flanges, a plurality of generally annular and interleaved friction clutch plates, means on said first pair of flanges guiding certain of said clutch plates, means on said second pair of flanges guiding other of said clutch plates, bearing means rotatably mounting certain of said first pair of flanges on certain of said second pair of flanges and disposed therebetween in generally axial alignment with said clutch plates, a generally cup-shaped annular clutch release member disposed in telescoping relation with said driven member and rotatable therewith, means on said clutch release member defining openings through which portions of certain of said clutch plates extend, means biasing said clutch release member toward its clutch engaged position, and means including a non-metallic release bearing normally spaced from said clutch release member and movable into engagement therewith for effecting movement thereof against said biasing means to a position in which said clutch is disengaged.

References Cited in the file of this patent

UNITED STATES PATENTS

| | | |
|---|---|---|
| 716,754 | Pivert | Dec. 23, 1902 |
| 787,031 | Girardot | Apr. 11, 1905 |
| 909,894 | Hanson | Jan. 19, 1909 |
| 1,018,620 | Jones | Feb. 27, 1912 |
| 1,189,355 | Ellett | July 4, 1916 |
| 1,307,954 | Bowman | June 24, 1919 |
| 1,438,486 | Gorman | Dec. 12, 1922 |
| 1,790,284 | Reed | Jan. 27, 1931 |
| 2,177,362 | Eason | Oct. 24, 1939 |
| 2,179,360 | Vasta | Nov. 7, 1939 |
| 2,679,769 | Parrett | June 1, 1954 |
| 2,812,047 | Smitzer | Nov. 5, 1957 |

FOREIGN PATENTS

| | | |
|---|---|---|
| 359,480 | Germany | Sept. 23, 1922 |